(12) United States Patent
Wierzbitzki et al.

(10) Patent No.: US 6,807,268 B1
(45) Date of Patent: Oct. 19, 2004

(54) SEQUENTIAL CALLING SYSTEM WITH PRIORITIZATION OF THE LAST DIALED TELEPHONE NUMBER

(75) Inventors: Dirk Wierzbitzki, Ratingen (DE); Matthias Krömer, Düsseldorf (DE)

(73) Assignee: Vodafone Holding GmbH, Düsseldorf (DE)

( * ) Notice: Subject to any disclaimer, the term of this patent is extended or adjusted under 35 U.S.C. 154(b) by 0 days.

(21) Appl. No.: 09/787,159
(22) PCT Filed: Mar. 17, 1999
(86) PCT No.: PCT/DE99/00846
§ 371 (c)(1), (2), (4) Date: Apr. 26, 2001
(87) PCT Pub. No.: WO00/16540
PCT Pub. Date: Mar. 23, 2000

(30) Foreign Application Priority Data

Sep. 14, 1998 (DE) .................. 198 43 201

(51) Int. Cl.[7] ............................... H04M 3/42
(52) U.S. Cl. ................. 379/211.01; 379/211.12; 455/417
(58) Field of Search ............... 379/211.01, 211.02, 379/212.01, 201.01, 207.02, 207.04, 207.05; 455/414.1, 417, 445

(56) References Cited

U.S. PATENT DOCUMENTS

| | | | | |
|---|---|---|---|---|
| 5,315,636 A | * | 5/1994 | Patel .................... | 379/201.07 |
| 5,802,160 A | * | 9/1998 | Kugell et al. .......... | 379/211.04 |
| 5,896,448 A | * | 4/1999 | Holt ...................... | 379/221.03 |
| 5,905,789 A | * | 5/1999 | Will ...................... | 379/211.03 |
| 6,104,799 A | * | 8/2000 | Jain et al. .............. | 379/211.01 |

* cited by examiner

Primary Examiner—Benny Tieu
(74) Attorney, Agent, or Firm—Cohen, Pontani, Lieberman & Pavane

(57) ABSTRACT

A waiting time optimization for a caller of a called party having a number of telephone numbers is obtained by a device and a method for establishing a telecommunication connection from a caller to a called party via at least one telecommunication network, in which the called party can possibly be reached on a number of telephone numbers stored in the telecommunication network. A telecommunication connection between the caller and the called party is set up in each case successively attempted on the stored telephone numbers by dialing in each case one of the stored telephone numbers of the called party until a telecommunication connection to the called party has been successfully set up. When a telecommunication connection has been successfully set up, the telephone number of the called party on which this successful setting-up took place is stored in the telecommunication network. In the case of a successive calling of stored telephone numbers of a called party, the stored telephone number of this called party on which a telecommunication connection has last been set up successfully is called as the first or second telephone number.

18 Claims, 3 Drawing Sheets

— Signaling channel
— Traffic channel

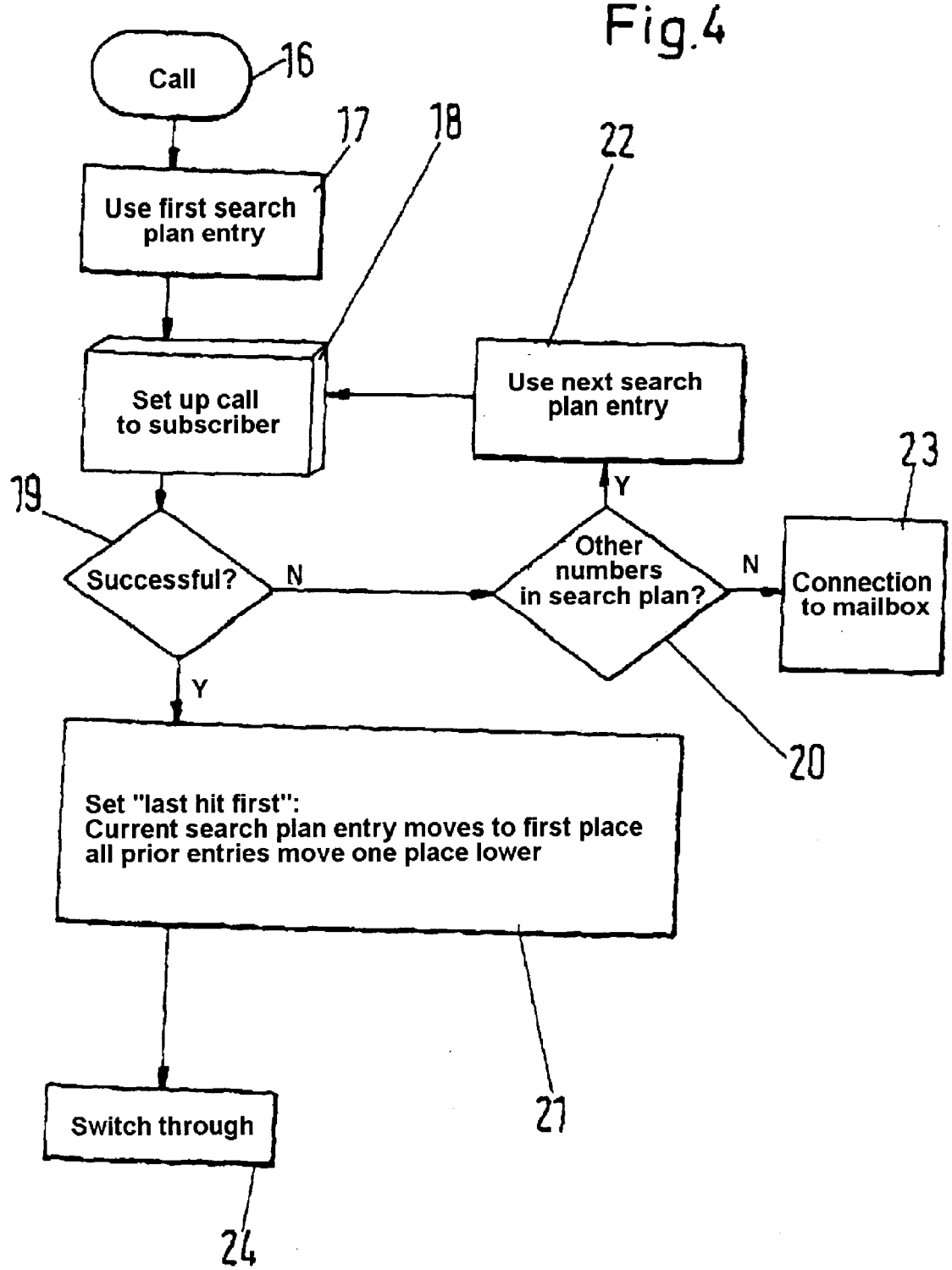

SEQUENTIAL CALLING SYSTEM WITH PRIORITIZATION OF THE LAST DIALED TELEPHONE NUMBER

PRIORITY CLAIM

This is a U.S. national stage of application No. PCT/DE99/00846, filed on Mar. 17, 1999. Priority is claimed on that application and on the following application(s):

Country: Germany, Application No.: 198 43 201.1, Filed: Sep. 14, 1998.

BACKGROUND OF THE INVENTION

This invention relates to a method for establishing a telecommunication connection from a caller to a called party over at least one telecommunication network, in which the called party can possibly be reached on a number of telephone numbers stored in the telecommunication network.

A method for successively calling a called telecommunication subscriber on a number of telephone numbers stored for him is known, in principle. Under ISDN, for example, automatic call forwarding can be programmed, for example, in a terminal, and forwards the call to one or more successively dialed other stored telephone numbers if no telephone connection can be successfully set up here (because the handset is not picked up on this telephone number).

During the successive dialing of a number of stored telephone numbers of a caller, the calling party experiences a waiting time which can easily be quite long in the case of a relatively large number of telephone numbers of the called party. This especially applies in the case where, when one of the possible stored telephone numbers of the called party is called, the telecommunication network waits for a predetermined time (time out) for example by letting the telephone on this telephone number perform a predetermined number of rings (e.g. 10).

SUMMARY OF THE INVENTION

The object of the present invention is, therefore, to optimize as simply and ergonomically as possible the waiting time of a calling party who calls a called party having a number of stored telephone numbers on which the called party can possibly be reached.

Since, according to the invention, the telephone number on which a called party has last been successfully reached is stored in the telecommunication network and this stored telephone number of the called party is in each case called first in a successive calling of a called party, the waiting times are shortened successfully and in a simple manner for the calling party since this method implicitly takes into consideration the probability of a successful call. Since no elaborate statistics need to be maintained for this, the method can be executed and implemented in a simple and inexpensive manner. It is also very ergonomic for the caller since no additional actions or inputs are required from him.

The method can also be used if the call between the caller and the called party is conducted via a number of telecommunication networks, for example two mobile radio networks or one landline network and one mobile radio network. The signaling during the attempted call setup (on in each case one of the stored called telephone numbers) can be carried out in the usual manner.

If one of the stored telephone numbers of a called party at which he can be reached is a mobile telephone number, it is appropriate to call this mobile telephone number first.

It can already be considered to be a successful setup of a telephone connection to one of the stored telephone numbers if the called party lifts the handset and a complete connection (complete voice connection/TCH) is produced or only if someone answers personally with a human voice on a telephone number of the called party or if, after the lifting of the handset, an acoustic (voice or DTMF) input occurs at the end of the called party, especially an input requested by the telecommunication network (e.g. "press 1 or say 1 if you want to accept the call"). One of the telephone numbers stored for a called party can be a universal telephone number. However, the universal telephone number can also be stored separately and only produce the successive dialing of other ones, namely the telephone numbers stored as possible numbers of the called party.

In particular, the universal telephone number can be a mobile number of the called party.

The stored telephone numbers of a called party can be changed, for example by Internet or via a mobile telecommunication network or a landline network. In this context, in particular, the times of day (possibly differentiated by days of the week) at which a called party wishes to be available on his stored telephone numbers in what order can be stored, and if there is a stored last successful telephone number (according to the invention), an override (dialing of this stored last successful telephone number in principle) can be effected.

With regard to the device for implementing the invention, memories are provided for the several telephone numbers of a telecommunication subscriber on which the latter can possibly be reached, in principle, a memory for the telephone number on which he was available last and a telephone number dialing device which is constructed in such a manner (as program or as hardware implementation) that, when the called party is called, it successively dials his stored telephone numbers until a telecommunication connection is successfully set up and that it stores for a respective telecommunication subscriber the telephone number on which he was last successfully called. The telephone number dialing device is constructed in such a manner that it in each case attempts to reach a called party first on the telephone number on which he was last successfully available, that is to say a telecommunication connection was set up (for example by picking up the handset or picking up and giving a code word).

BRIEF DESCRIPTION OF THE DRAWINGS

Other features and advantages of the invention are obtained from the further subclaims and the following description of an exemplary embodiment, referring to the drawing, in which:

FIG. 4 shows the rough sequence of a method according to the invention as a flow chart.

DETAILED DESCRIPTION OF THE PREFERRED EMBODIMENTS

Figure 1:
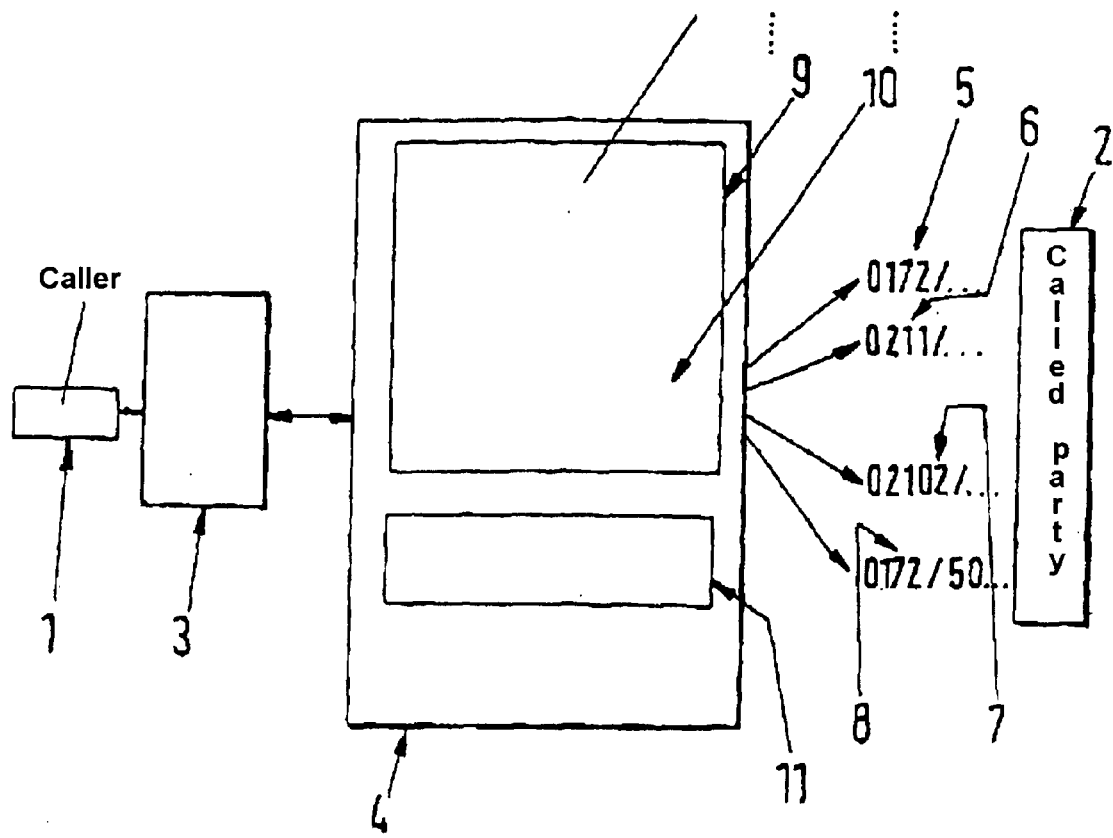
FIG. 1 shows the basic function of a universal number system with a number of telephone numbers of a called party.

FIG. 1 shows as a rough block diagram the principle of a call diversion service for a personal call number of a telecommunication subscriber. A caller 1 would like to call a called party 2 via one or more telecommunication network(s). In this case, the call is via two telecommunication networks, only shown roughly diagrammatically, in the form of the landline network 3 and the interconnected mobile radio network 4 since the caller is here calling from a landline network and the called party had his "personal call number" service implemented in the mobile radio network allocated to him.

The caller calls a universal telephone number of the called party 2 by dialing this number on his telephone set. A universal telephone number can begin, for example, with a universal telephone number code (0700 in this case) which can be previously reserved as universal telephone number in the numbering plans in one country or in a multiplicity of countries. Instead of the 0700 number, a universal telephone number can also be a conventional telephone number. In particular, the universal telephone number can begin with a dialing code which identifies a particular telecommunication network, for example a mobile radio network 4 (such as, for example, the German D2 network) by the dialing code (+49/172 or 0172) when the personal call number services are implemented in this mobile telecommunication network 4. In this case, the universal telephone number can be one of the telephone numbers of the called party on which he can possibly be reached. The various telephone numbers of the called party can be allocated to different networks. Thus, for example, at least one telephone number can be a mobile number; at least one telephone number can also be a landline network number; one or more telephone number(s) can be mailbox numbers, that is to say numbers of electronic answering machines in the telecommunication network 4 (or another telecommunication network) or at the called party.

As is usual in telecommunication networks, the possibility of signaling and of telecommunication via a complete communication connection exists between the caller, the telecommunication network 3, the telecommunication network 4 and the called party 2. Signaling can take place everywhere or partially via other channels as telecommunication. Signaling and telecommunication can take place, for example, via the same lines particularly between the caller and the telecommunication network with which he is directly connected (3). Signaling and telephone connection (TCH) can take place via different forwarding arrangements especially between different telecommunication networks 3, 4.

If then the caller 1 calls a universal number of the called party 2, one of the telecommunication networks 3, 4, in this case mobile radio network 4, attempts to reach the called party 2. The called party 2 here has the telephone numbers numbered consecutively with reference symbols 5 to 8, namely 0172/ . . . (5), 0211/ . . . (6), 02102/ . . . (7), 0172/50 . . . (8).

These telephone numbers 5 to 8 of the telecommunication subscriber 2 (who is here the called party) are stored in a device of one of the telecommunication networks (4). In this memory 9, the telephone numbers on which he is possibly available are here stored for in each case one telecommunication subscriber. For example, for a telecommunication subscriber 2 it is stored that he is available on number 0172/ . . . (reference symbol 5) from 8 to 12, on telephone number 0211/. . . (reference symbol 6) from 9 to 1800 hours, on private telephone number 02102/ . . . (reference symbol 7) from 1800 to 0900 hours and at mailbox 8 (which is arranged in telecommunication network 4) if one of the above numbers is not available. The time slices of the different telephone numbers can overlap as in this case. When a call is made, a check is made in each case by means of a clock in the telecommunication network (4) as to which of the telephone numbers in the memory which are possible for the called party telecommunication subscriber 2 is to be currently successively dialed. In the case of a call around 09.30 hours, it is, for example, number 0172/ . . . (reference symbol 5) and number 0211/ . . . (reference symbol 6) and, when the first two numbers (5 and 6) cannot be reached, the telephone number of the mailbox 0172/50 . . . (reference symbol 8) in the network.

In principle, a telephone number (the telephone number with the reference symbols 5 to 8 or, in the case listed above, with numbers 5, 6, 8 about 9.30) can be successively called until a telecommunication connection has been successfully set up to the called party 2 (by the latter picking up the handset or picking it up and performing a predetermined voice input or key input etc. or the like). However, the caller must wait for this for a relatively long time. For this reason, the last successful number 10 on which a telecommunication connection has been successfully set up from any caller to this called party is stored in the same memory or another memory 9 according to the invention as soon as a called party has been successfully called on a number. Thus, if the called telecommunication subscriber 2 was last available on his mobile telephone 0172/ . . . (reference symbol 5), this number 0172/ . . . or a memory address of this number is stored as the last successful telephone number 10. With the next call of any (same or other) caller 1 of this called party 2, this telephone number having the reference symbol 10 (0172/ . . . ) at which the called party was last available, is then dialed first. This considerably shortens the average waiting time of the caller.

The method could also be extended by detecting and storing (9) the frequency of availability of a telephone number in general or the frequency of availability of a telephone number at certain times or by storing, not only for the first one but also for the following telephone numbers, an order in which these are to be called.

For the successive dialing of the telephone numbers (with reference symbols 5 to 8) of a called telecommunication subscriber 2, a telephone number dialing device which, with a call to a called party 2, finds out from a table, on the basis of the called universal number (070 . . . or 0172 . . . ) whether he should get the service according to the invention, is provided in the telecommunication network 4. If he should get it, the telephone number dialing device 11 successively takes the stored telephone numbers (with the reference symbols 5 to 8) of the called telecommunication subscriber 2 from the memory 9 and in each case calls one telephone number after the other until it sets up a successful telecommunication connection, calling as first number the called party 2 on the telephone number (reference symbol 10) in memory 9 on which a successful telecommunication connection had been set up to him.

The signaling implementation in the network can be effected in different ways.

Figure 2:
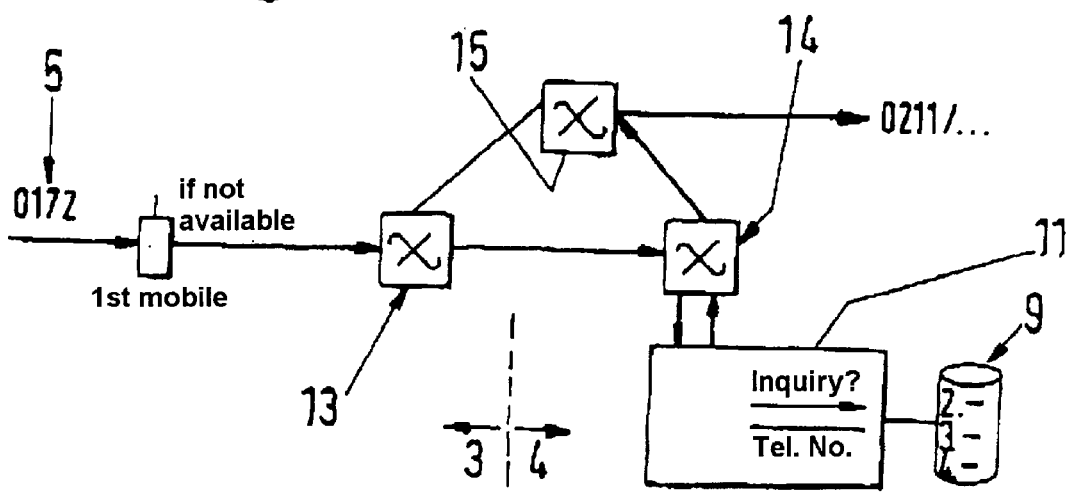
FIG. 2 shows the implementation of the signaling in the case of switching by a separate unit of a telecommunication network.

FIG. 2 roughly diagrammatically shows the implementation of the signaling and switching by a separate unit in the telecommunication network (4 in FIG. 1).

In this example, the telephone number (number 10 in FIG. 1) on which a called telecommunication subscriber (2) has last been reached successfully, is in each case called as the second telephone number. A mobile telephone number of the called party is in each case called as the first telephone number here. This is particularly appropriate if a mobile number of the called party is used as the universal number. Thus, if someone is called on his mobile number (having reference symbol 5 in FIG. 1 or 2) 0172/..., it will first be attempted to reach him on this telephone number 0172/... (5) and it is only if he is not available on this telephone number (called as the first number) that a check is made as to which telephone number (reference symbol 10 in FIG. 1) of the called telecommunication subscriber 2 enabled a successful telecommunication connection to be set up to this called party as the last telephone number. In this case, the telephone number of the called party 2 to which a telecommunication connection has been successfully set up (originating from the same caller or another caller) is called as the second telephone number. This considerably reduces the signaling expenditure in the telecommunication network which handles the switching operations to the telephone numbers (5 to 8) and the signaling to other telecommunication networks 3 (in as much as they are involved) so that the method becomes more efficient and less expensive as a result.

FIG. 2 also shows the memory 9 from FIG. 1 and the telephone number dialing device 11 which handles the signaling operations to the switch. Above it, a number of switching centers 13, 14, 15 are diagrammatically shown which can be MSCs and especially gateway MSCs. The gateway MSC can be, for example, MSC 13 between a landline network 3 (on which the caller is calling) and a mobile radio network 4 into which the call is placed. MSC 15, too, which here leads into a landline network again, can also be a gateway MSC. In this arrangement, the telephone number dialing device 11, in the form of a separate unit, handles the switching operations during the dialing of the different telephone numbers. Between the telephone number dialing device 11 and MSC 14 to which it is connected, a traffic channel (TCH) is provided.

Figure 3:
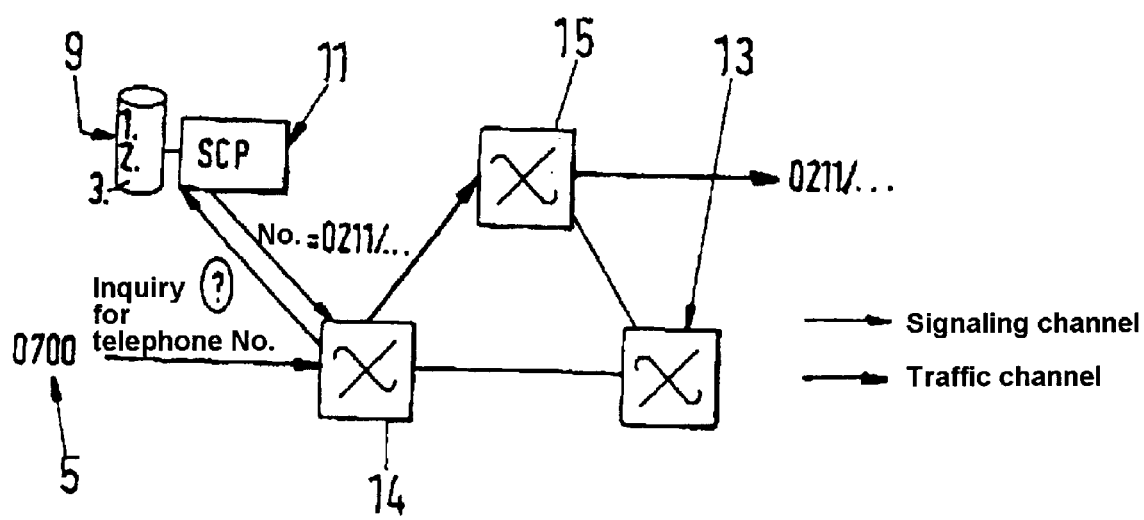
FIG. 3 shows the implementation of the signaling by means of an intelligent network.

As shown in FIG. 3, an implementation in an intelligent network can also be effected in such a manner that the switching takes place directly in switching centers 13, 14, 15. In FIG. 3, only a (bidirectional) signaling channel exists between the telephone number dialing device 11 (called service control point (SCP)) and the MSC 14 to which it is connected. Thus, the switching center 14 handles the switching to the different call numbers (having reference symbols 5 to 8 in FIG. 1) and only retrieves the different numbers 5 to 8 of the called telecommunication subscriber 2 via a signaling channel from the device 11 but carries out the dialing of the different telephone numbers (including waiting time check/time out, dialing, checking of the input of a signal from the keyboard or by voice announcement ("Please press 1 or say 1 for acceptance") etc.

FIG. 4 shows the rough sequence of the method according to the invention as a flow chart. In the case of a call 16 from a caller (1), the first transmit plan entry is first retrieved from the memory (9) (possibly taking into consideration the clock time of the call and the time slices for a number). Following this, it is attempted in step 18 to establish a telecommunication connection to the called telecommunication subscriber 2; that is to say he is dialed on the telephone number of this transmit plan entry.

Following this, a check is made in step 19 as to whether a telecommunication connection has been set up successfully to the called party on this call number. If not, that is to say if the called party has not been reached (because of time out or non-entry of a requested code etc.), a check is made in step 20 as to whether there are other telephone numbers (excluding a mailbox in the network) of the caller in memory 9. If so, the next search plan entry (telephone number 6, 7 etc.) is fetched from the memory in step 22 and in step 18 another attempt is made to set up a complete telecommunication connection to this telephone number of the called telecommunication subscriber. If no further telephone number entries (excluding the mailbox 8 in the network) have been found, or found for the time of the call, for the called telecommunication subscriber in step 20 (N), the caller is connected to a mailbox (8 in FIG. 1) in a network as a telecommunication connection in step 23. If it was decided in step 19 (Y) that the setting up of a telecommunication connection to the called telecommunication subscriber 2 was successful, that is to say that he has been reached or accepted the call by entering a signal etc., the telephone number (5 to 7 or 5 to 8) on which the called party 2 has last been reached (by any caller) is stored as the last successful number (10) in step 21 and the caller is switched through to the called party (24). If one of the telephone numbers (reference symbol 8 in FIG. 1) is a mailbox of the called party 2 in the network, the storing of this telephone number (8) of the mailbox in the network as the last telephone number successfully called can also be suppressed; in this manner, the telephone number to which a telecommunication connection has been successfully set up, is only stored here if it is not a mailbox of the called party in the network; if a mailbox (8) of the called party in the network has last been successfully called, there is no entry which means that, in turn, the last telephone number of the called party successfully called before that (either one of 5, 6, 7 or one of 6, 7) remains stored.

Additionally or as an alternative, the storing of the last telephone number 10 successfully called can also be suppressed if the universal number of the called party is one of his telephone numbers (e.g. his mobile telephone number 0172/... (5)) and he was successful on this called telephone number 5 which is identical with his universal number which is called from the outside by the called party so that, in this case, only his other called telephone numbers 6 and 7 are stored as last telephone number successfully called (10 in FIG. 1) in the case of having been called successfully.

The last successful number (10) is only taken into consideration if a predetermined or predeterminable timer has not elapsed since.

The method according to the invention can be implemented as an electronic circuit or in another way. Although the core of the invention does not lie in a program, an implementation of the invention can also comprise a program.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A method for establishing a telecommunication connection from a caller to a called party via at least one telecommunication network, comprising the steps of:

storing a plurality of telephone numbers at which the called party can possibly be reached in the telecommunication network and storing a universal telephone number in the telecommunication network for a telecommunication subscriber;

successively attempting to set up a telecommunication connection to the called party by dialing in each case one of the stored telephone numbers of the called party until a telecommunication connection to the called party has been successfully set up, said step of successively attempting being performed when the universal number is dialed by a caller and including first dialing a mobile number of the called party and subsequently dialing a second telephone number as the telephone number which was stored as the last successful telephone number of the called party;

storing, when a telecommunication connection has been successfully set up, the telephone number of the called party on which the successful setting-up took place in the telecommunication network; and effecting a connection from the caller to the called party.

2. A method as defined in claim 1, wherein the connection effecting step includes effecting the connection from the caller to the called party via a plurality of telecommunication networks.

3. A method as defined in claim 1, wherein the telecommunication networks between the called party and the caller include a landline network, a telecommunication network and mobile radio network.

4. A method as defined in claim 1, including starting a clock with the dialing of one of the stored telephone numbers and considering the telecommunication connection to this telephone number to be unsuccessful and dialing a next telephone number when the clock elapses a specified time.

5. A method as defined in claim 1, including handling switching to the telephone numbers of the called party which are to be successively dialed with a unit separate from the switching centers of a telecommunication network.

6. A method as defined in claim 1, including defining only a switched-through voice connection to the called party as a successful telecommunication connection.

7. A method as defined in claim 6, including only considering a telecommunication connection to one of the telephone numbers of the called party as a successful telecommunication connection if a person with a voice answers as the called party.

8. A method as defined in claim 7, wherein the call on a telephone number is only considered to be successful if the called party inputs one of a predetermined acoustic and a predetermined key input at his terminal.

9. A method as defined in claim 1, including storing at least one stored universal telephone number as one of the stored telephone numbers of the called party.

10. A method as defined in claim 1, wherein the universal telephone number is the mobile number of the called party.

11. A method as defined in claim 1, including storing the telephone numbers so that the stored telephone numbers are changeable.

12. A method as defined in claim 1, wherein the storing step includes storing, together with the stored telephone numbers of a called party, at least one of time of day and day of the week at which the numbers are to be called during successive calling and the numbers are not called outside these times of day and days of the week during successive calling.

13. A method as defined in claim 12, including, when a telephone number of a called party is stored on which a telecommunication connection has last been set up successfully, calling the called party first on this telephone number if another order of the successive calling is stored together with the stored telephone numbers.

14. A device for establishing a telecommunication connection from a caller to a called party via a telecommunication network, the device comprising:

a memory storing for a plurality of telephone numbers in each case of a called party who can be reached on at least one of the stored telephone numbers when called and a universal telephone number in the telecommunication network for the called party;

a memory storing for the telephone number of the called party on which a telecommunication connection has last been set up successfully to the called party called by the caller; and a telephone number dialing device operative so that in case of a call to the universal number of the called party the dialing device in each case successively attempts to set up a telecommunication connection to the called party on the stored telephone numbers by dialing in each case one of the stored telephone numbers of the called party until a telecommunication connection to the called party has been successfully set up, wherein the successive attempts include first dialing a mobile number of the called party and subsequently dialing a second telephone number as the telephone number which was stored as the last successful telephone number of the called party, in the case of a successful setting-up of a telecommunication connection the dialing device stores the telephone number of the called party on which this successful setting-up took place in the telecommunication network.

15. A device as defined in claim 14, wherein the telephone number dialing device is arranged in a switching center of a telecommunication network, and further comprising signaling channels, via which successive telephone numbers to be dialed are transmitted, connected between the telephone number dialing device and the memory.

16. A device as defined in claim 14, wherein the telephone number dialing device is a device of a telecommunication network which is separate from the switching centers of the telecommunications network.

17. A device as defined in claim 14, and further comprising a clock operatively provided so as to be started in the telecommunication network with a call of one of the stored telephone numbers of the called party, whereby elapsing of a specified time by the clock triggers dialing of the next telephone number by the telephone number dialing device.

18. A method for establishing a telecommunication connection from a caller to a called party using at least one telecommunication network, comprising the steps of:

storing a plurality of telephone numbers at which a called party can be reached in a telecommunication network and storing one of the plurality of telephone numbers as a universal telephone number in the telecommunication network for telecommunication subscriber;

successively attempting to set up a telecommunication connection to the called party when the universal number is dialed by a caller by first dialing the universal number comprising the one of the plurality of telephone numbers of the called party and checking, if the called party is unavailable at the one of the plurality of telephone numbers, for the last successful number at which the called party was reached and subsequently dialing the last successful number;

storing, when a telecommunication connection has been successfully set up, the telephone number of the called party on which the successful setting-up took place in the telecommunication network; and effecting a connection from the caller to the called party.

* * * * *